United States Patent
Kim et al.

(10) Patent No.: US 12,288,030 B2
(45) Date of Patent: Apr. 29, 2025

(54) ELECTRONIC APPARATUS AND METHOD FOR CONTROLLING THEREOF

(71) Applicant: Samsung Electronics Co., Ltd., Suwon-si (KR)

(72) Inventors: Jiwan Kim, Suwon-si (KR); Jonghyun Kim, Suwon-si (KR); Soyoon Park, Suwon-si (KR); Indong Lee, Suwon-si (KR); Sungjun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 17/739,827

(22) Filed: May 9, 2022

(65) Prior Publication Data

US 2022/0269861 A1    Aug. 25, 2022

Related U.S. Application Data

(63) Continuation of application No. PCT/KR2022/000542, filed on Jan. 12, 2022.

(30) Foreign Application Priority Data

Feb. 18, 2021    (KR) .................. 10-2021-0021654

(51) Int. Cl.
   *G06V 30/148*    (2022.01)
   *G06F 40/289*    (2020.01)
   (Continued)

(52) U.S. Cl.
   CPC .......... *G06F 40/289* (2020.01); *G06F 40/58* (2020.01); *G06V 30/148* (2022.01); *G06V 30/1916* (2022.01)

(58) Field of Classification Search
   CPC ..... G06F 40/289; G06F 40/58; G06V 30/153; G06V 30/148; G06V 30/1916
   See application file for complete search history.

(56) References Cited

U.S. PATENT DOCUMENTS 8,468,013 B2    6/2013    Yang et al.
8,543,376 B2    9/2013    Hwang et al.
(Continued)

FOREIGN PATENT DOCUMENTS

CN    112711943 B  *  11/2023    ......... G06F 16/3344
JP       3547350 B2 *   7/2004
(Continued)

OTHER PUBLICATIONS

International Search Report and Written Opinion dated Apr. 19, 2022, issued in International Patent Application No. PCT/KR2022/000542.

*Primary Examiner* — Shaghayegh Azima
(74) *Attorney, Agent, or Firm* — Jefferson IP Law, LLP

(57) ABSTRACT

An electronic apparatus and a control method thereof are provided. The control method includes acquiring a plurality of words, acquire a plurality of word combinations by combining the plurality of words, and acquiring first scores indicating the sentence completeness of each of the plurality of word combinations by inputting each of the plurality of word combinations to a first a language model for identifying a sentence completeness, based on all the first scores with respect to each of the plurality of word combinations being identified to be less than a predetermined value, acquire second scores for each of the plurality of word combinations by inputting each of the plurality of word combinations to a sentence separation model for identifying an accuracy of a word combination, identifying one word combination among the plurality of word combinations based on the second scores, and providing the identified one word combination to a translation model which performs translation.

15 Claims, 12 Drawing Sheets

(51) Int. Cl.
    *G06F 40/58*         (2020.01)
    *G06V 30/19*         (2022.01)

(56) References Cited

U.S. PATENT DOCUMENTS

| | | |
|---|---|---|
| 11,093,719 B2 | 8/2021 | Lee et al. |
| 11,182,566 B2 | 11/2021 | Jaitly et al. |
| 2001/0029455 A1 | 10/2001 | Chin et al. |
| 2004/0098247 A1 | 5/2004 | Moore |
| 2008/0235202 A1 | 9/2008 | Wang et al. |
| 2014/0075273 A1 | 3/2014 | Fisher et al. |
| 2018/0082681 A1* | 3/2018 | Fujiwara .................. G06F 40/45 |
| 2018/0329894 A1* | 11/2018 | Zhao ....................... G06F 40/51 |
| 2019/0251174 A1 | 8/2019 | Lee et al. |

FOREIGN PATENT DOCUMENTS

| | | |
|---|---|---|
| JP | 2007-323476 A | 12/2007 |
| JP | 2008-234656 A | 10/2008 |
| JP | 2020-166664 A | 10/2020 |
| JP | 6817556 B2 | 1/2021 |
| KR | 10-2010-0079113 A | 7/2010 |
| KR | 10-1682207 B1 | 12/2016 |
| KR | 10-1692930 B1 | 1/2017 |
| KR | 10-2019-0090636 A | 8/2019 |
| KR | 10-2019-0097629 A | 8/2019 |
| KR | 10-2020-0041199 A | 4/2020 |

\* cited by examiner

FIG. 2B

LET'S GET A DISCOUNT AND GET YOUR HAIR DONE IN THE MORNING!

| | |
|---|---|
| BASIC PERM | 40,000 |
| CLINIC PERM | 50,000 |
| DYE ROOTS | 35,000 |
| DYE WHOLE HAIR | 50,000 |
| SETTING | 60,000 |
| CLINIC SETTING | 90,000 |

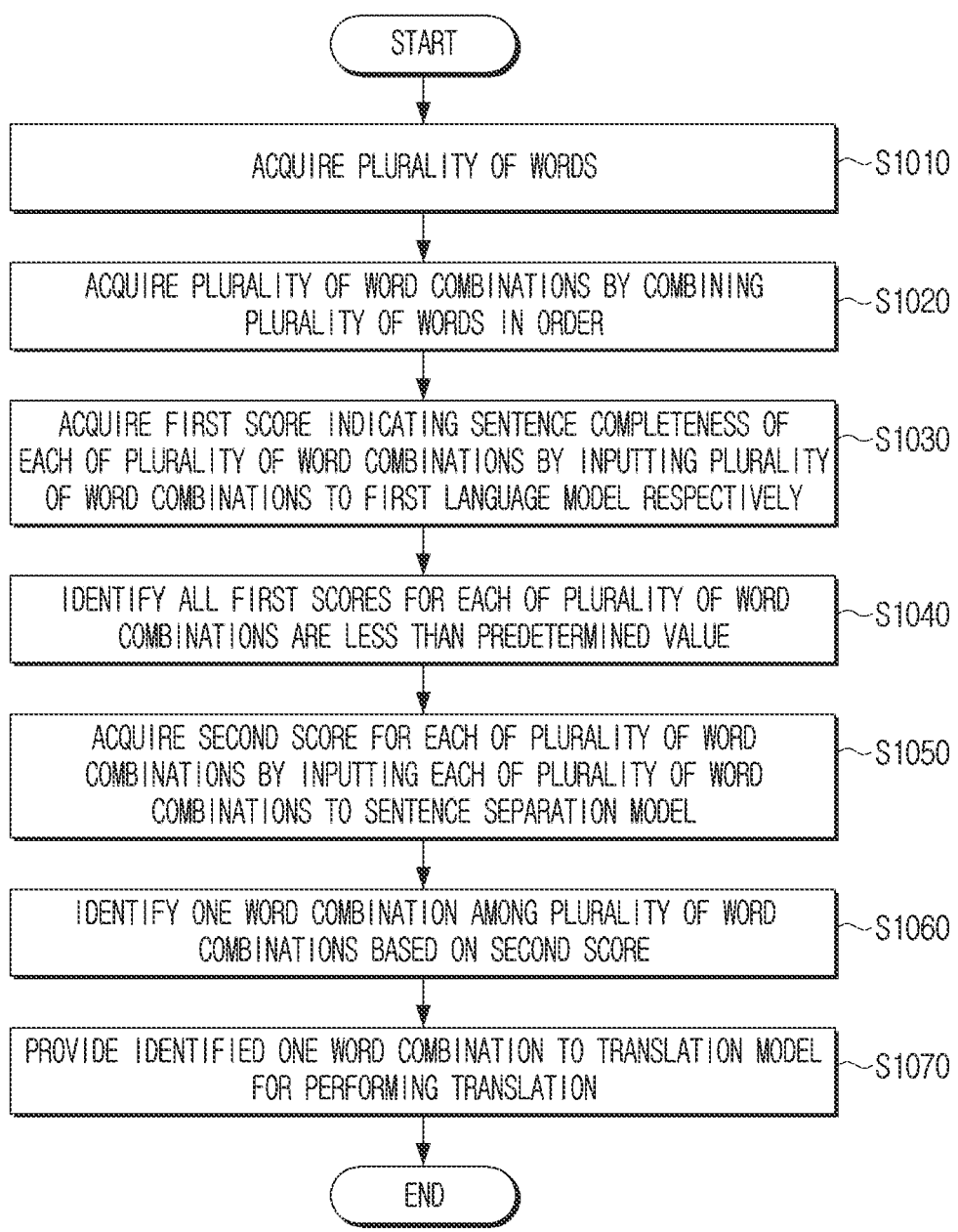

ELECTRONIC APPARATUS AND METHOD FOR CONTROLLING THEREOF

CROSS-REFERENCE TO RELATED APPLICATION(S)

This application is a continuation application, claiming priority under § 365(c), of an International application No. PCT/KR2022/000542, filed on Jan. 12, 2022, which is based on and claims the benefit of a Korean patent application number 10-2021-0021654, filed on Feb. 18, 2021, in the Korean Intellectual Property Office, the disclosure of which is incorporated by reference herein in its entirety.

TECHNICAL FIELD

The disclosure relates to an electronic apparatus and a method for controlling the electronic apparatus. More particularly, the disclosure relates to an electronic apparatus for reorganizing a plurality of texts included in an image acquired through a camera and providing the reorganized text to a translation mode, and a method for controlling the same.

BACKGROUND ART

Recently, artificial intelligence systems have been used in various fields. In particular, artificial intelligence systems are widely used in the field of translating various languages.

In the prior art, there is a technique for acquiring a plurality of words through an optical character reader (OCR) method from an image photographed by a camera, and providing a translation of the acquired plurality of words.

However, in the prior art, there is a problem in that it is difficult to acquire an accurate translation result by inputting all of the plurality of words acquired from an image into a translation model without separation of sentences.

The above information is presented as background information only to assist with an understanding of the disclosure. No determination has been made, and no assertion is made, as to whether any of the above might be applicable as prior art with regard to the disclosure.

TECHNICAL SOLUTION

Aspects of the disclosure are to address at least the above-mentioned problems and/or disadvantages and to provide at least the advantages described below. Accordingly, an aspect of the disclosure is to provide an electronic apparatus capable of performing translation by separating a plurality of words into sentence units, and a method for controlling the same.

Additional aspects will be set forth in part in the description which follows and, in part, will be apparent from the description, or may be learned by practice of the presented embodiments.

In accordance with an aspect of the disclosure, a method for controlling an electronic apparatus is provided. The method includes acquiring a plurality of words, combining the plurality of words in order to acquire a plurality of word combinations, inputting each of the plurality of word combinations to a first a language model for identifying a sentence completeness, and acquiring first scores indicating the sentence completeness of each of the plurality of word combinations, based on all the first scores with respect to each of the plurality of word combinations being identified to be less than a predetermined value, inputting each of the plurality of word combinations to a sentence separation model for identifying an accuracy of a word combination to acquire second scores for each of the plurality of word combinations, identifying one word combination among the plurality of word combinations based on the second scores, and providing the identified one word combination to a translation model which performs translation.

The identifying the one word combination may further include, based on a first word combination in which the first scores are equal to or greater than a predetermined value being identified to be existed among the plurality of word combinations, identifying one word combination among the plurality of word combinations based on the first score.

The acquiring the plurality of words may include acquiring an image including a plurality of words, and performing an image recognition for the image to acquire the plurality of words included in the image.

The acquiring the first score may include inputting the plurality of words to a second language model to acquire a sentence score indicating a sentence completeness of all the plurality of words, and based on the sentence score being identified to be equal to or greater than the predetermined value, combining the plurality of words in order to acquire a plurality of word combinations, and inputting the plurality of word combinations, respectively, to the first language model to acquire the first score.

The method may include, based on the sentence score being identified to be less than the predetermined value, inputting the plurality of words to the sentence separation model to acquire a word combination obtained by separating the plurality of words into sentence units, and providing the word combination to the translation model.

The acquiring the first score may include inputting at least one word group constituting the first word combination among the plurality of word combinations to the first language model, respectively, and based on scores corresponding to each of the at least one word group, acquiring a first score corresponding to the first word combination.

The acquiring the second score may include inputting at least one word group constituting the first word combination to the sentence separation model, respectively, to acquire scores corresponding to each of the at least one word group, and based on the scores corresponding to each of the at least one word group, acquiring a second score corresponding to the first word combination.

The acquiring the second score may include, based on the first scores with respect to each of the plurality of word combinations being identified to be less than the predetermined value, identifying at least one word combination among the plurality of word combinations based on the first scores, and inputting each of the at least one word combination to the sentence separation model to acquire second scores with respect to each of the at least one word combination, wherein the identifying the one word combination includes, based on the second scores, identifying at least one word combination among the at least one word combination.

The sentence separation model may be learned based on target data including a plurality of sentences and learning data in which sentence separation is removed from the target data.

The sentence separation model may be learned by using a pre-learned neural network model that separates spacing between words.

In accordance with another aspect of the disclosure, an electronic apparatus is provided. The electronic apparatus includes a memory configured to store at least one instruction, and a processor configured to execute at least one instruction stored in the memory to control the electronic apparatus, wherein the processor is configured to acquire a plurality of words, combine the plurality of words in order to acquire a plurality of word combinations, input each of the plurality of word combinations to a first a language model for identifying a sentence completeness, and acquire first scores indicating the sentence completeness of each of the plurality of word combinations, based on all the first scores with respect to each of the plurality of word combinations being identified to be less than a predetermined value, input each of the plurality of word combinations to a sentence separation model for identifying an accuracy of a word combination to acquire second scores for each of the plurality of word combinations, identify one word combination among the plurality of word combinations based on the second scores, and provide the identified one word combination to a translation model which performs translation.

The processor may be configured to, based on a first word combination in which the first scores are equal to or greater than a predetermined value being identified to be existed among the plurality of word combinations, identify one word combination among the plurality of word combinations based on the first score.

The processor may acquire an image including a plurality of word, and perform an image recognition for the image to acquire the plurality of words included in the image.

The processor may input the plurality of words to a second language model to acquire a sentence score indicating a sentence completeness of all the plurality of words, and based on the sentence score being identified to be equal to or greater than the predetermined value, combine the plurality of words in order to acquire a plurality of word combinations, and input the plurality of word combinations, respectively, to the first language model to acquire the first score.

The processor may, based on the sentence score being identified to be less than the predetermined value, input the plurality of words to the sentence separation model to acquire a word combination obtained by separating the plurality of words into sentence units, and provide the word combination to the translation model.

The processor may input at least one word group constituting the first word combination among the plurality of word combinations to the first language model, respectively, and based on scores corresponding to each of the at least one word group, acquiring a first score corresponding to the first word combination.

The processor may include inputting at least one word group constituting the first word combination to the sentence separation model, respectively, to acquire scores corresponding to each of the at least one word group, and based on the scores corresponding to each of the at least one word group, acquiring a second score corresponding to the first word combination.

The processor may include, based on the first scores with respect to each of the plurality of word combinations being identified to be less than the predetermined value, identifying at least one word combination among the plurality of word combinations based on the first scores, and inputting each of the at least one word combination to the sentence separation model to acquire second scores with respect to each of the at least one word combination, wherein the identifying the one word combination may include, based on the second scores, identifying at least one word combination among the at least one word combination.

Other aspects, advantages, and salient features of the disclosure will become apparent to those skilled in the art from the following detailed description, which, taken in conjunction with the annexed drawings, discloses various embodiments of the disclosure.

Through the embodiments described above, the electronic apparatus may reorganize a plurality of texts and provide them to the translation model, thereby improving an accuracy of translation.

BRIEF DESCRIPTION OF DRAWINGS

The above and other aspects, features, and advantages of certain embodiments of the disclosure will be more apparent from the following description taken in conjunction with the accompanying drawings, in which:

FIG. 2B is a view illustrating an image including a plurality of words according to an embodiment of the disclosure;

FIG. 10 is a flowchart illustrating a method of controlling an electronic apparatus according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
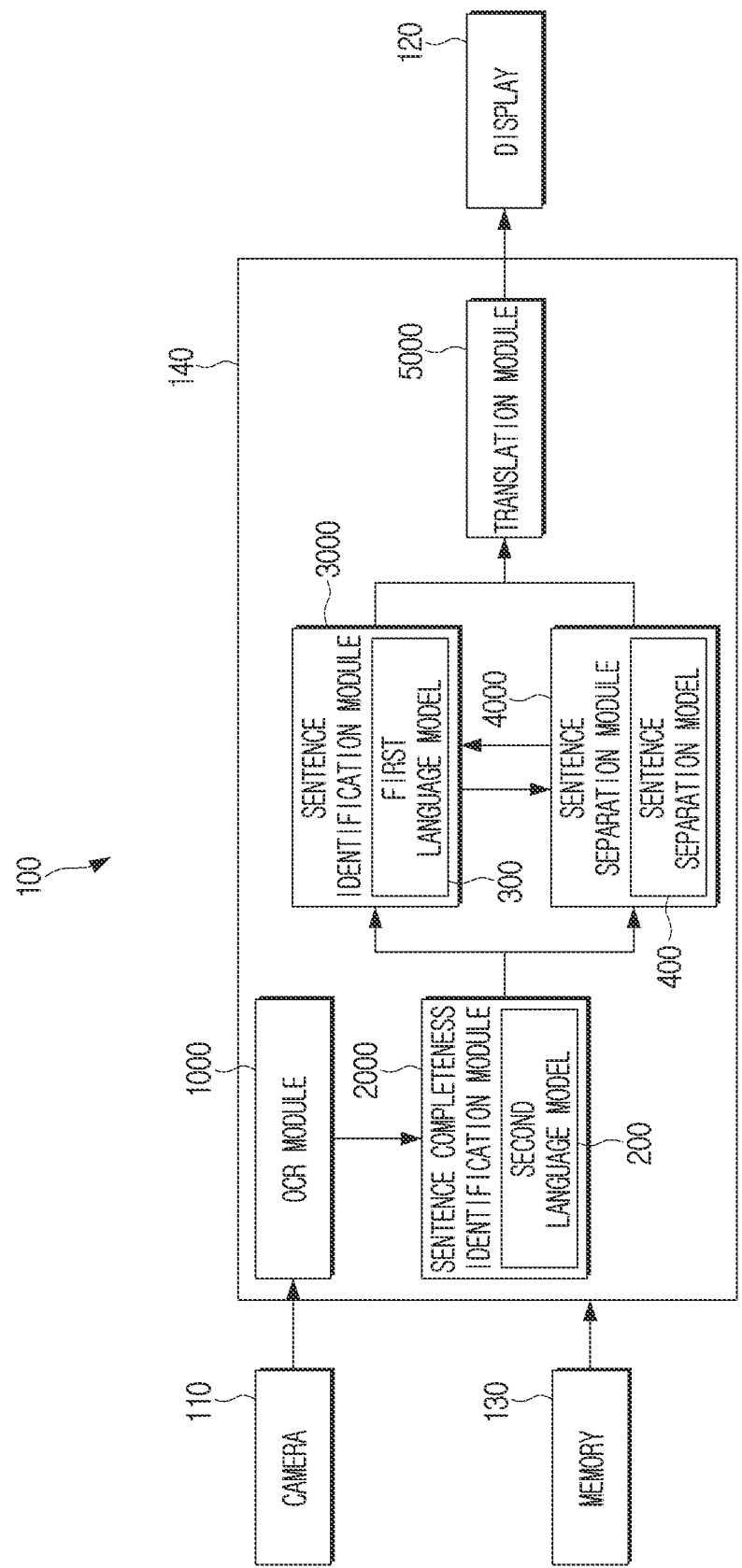
FIG. 1 is a block view illustrating a configuration of an electronic apparatus according to an embodiment of the disclosure.

FIG. 1 is a block view illustrating a configuration of an electronic apparatus according to an embodiment of the disclosure.

Referring to FIG. 1, an electronic apparatus 100 may include a camera 110, a display 120, a memory 130, and a processor 140. According to the disclosure, the electronic apparatus 100 may be implemented in various types of electronic apparatuses such as a smart phone, augmented reality (AR) glasses, a tablet personal computer (PC), a mobile phone, a video phone, an e-book reader, a television (TV), a desktop PC, a laptop PC, a netbook computer, a workstation, a camera, a smart watch, or the like.

The camera 110 is disposed on one side of the electronic apparatus 100 and is configured to acquire an image including a plurality of words. In this case, the electronic apparatus 100 may acquire an image including a plurality of words by photographing an image displayed on the display 120 through the camera 110. However, it is not limited thereto, and the electronic apparatus 100 may analyze the image displayed on the display 120 through the camera 110 in real time, and may acquire an image including a plurality of words when the image is identified as including the plurality of words.

The display 120 may display various information under the control of the processor 140. In particular, when the camera 110 is executed, the display 120 may display an image provided by the camera 110. In addition, the display 120 may display translated text provided according to a translation function according to the disclosure.

The display 120 may be realized as various kinds of displays, such as Liquid Crystal Display (LCD), Organic Light-Emitting Diode (OLED), Liquid Crystal on Silicon (LCoS), Digital Light Processing (DLP), or the like. Further, the display 120 may include a driver circuit that may be realized as a-si TFT, low temperature poly silicon (LTPS), TFT, OTFT, a backlight unit, or the like.

The display 120 may be a touch screen including a touch sensor.

The memory 130 may be implemented as a non-volatile memory, a volatile memory, a flash memory, a hard disk drive (HDD), a solid state drive (SDD), or the like. The memory 130 may be accessed by the processor 140, and perform readout, recording, correction, deletion, update, or the like, on data by the processor 140. According to an embodiment, the term of the memory may include the memory 130, read-only memory (ROM) (not illustrated) and random access memory (RAM) (not illustrated) within the processor 140, and a memory card (not illustrated) attached to the electronic apparatus 100 (e.g., micro secure digital (SD) card or memory stick). Further, the memory 130 may store programs, data, and so on to constitute various screens to be displayed on the display area of the display.

Also, although not illustrated in FIG. 1, the electronic apparatus 100 may further include a communication interface. The communication interface is a configuration capable of performing communication with an external device. Meanwhile, communicating the communication interface with the external device may include communicating through a third device (e.g., a repeater, a hub, an access point, a server, a gateway, or the like). The wireless communication, for example, may include a cellular communication using at least one among long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communications (GSM). According to an embodiment, wireless communication may include at least one of, for example, wireless fidelity (Wi-Fi), Bluetooth, Bluetooth low energy (BLE), ZigBee, near field communication (NFC), magnetic secure transmission, radio frequency RF, or body area network BAN. Wired communication may include at least one of, for example, universal serial bus (USB), high definition multimedia interface (HDMI), recommended standard232 (RS-232), power line communication, or plain old telephone service (POTS). A network in which wireless communication or wired communication is performed may include at least one of a telecommunication network, for example, a computer network (e.g., local area network (LAN) or wide area network (WAN)), the Internet, or a telephone network.

Particularly, the communication interface may receive a second language model 200, a first language model 300, and a sentence separation model 400 learned by communicating with an external server. However, it is not limited thereto, and the processor 140 may directly learn the second language model 200, the first language model 300, and the sentence separation model 400.

The processor 140 may be electrically connected to the memory 130 to control overall operations and functions of the electronic apparatus 100. The processor 140 may include one or a plurality of processors. In this case, the one or more processors are a general-purpose processor such as a central processing unit (CPU), an application processor (AP), and a graphics-only processor such as a graphics processing unit (GPU), a Visual Processing Unit (VPU), or the like, or an artificial intelligence (AI)-only processor such as a Neural Processing Unit (NPU).

One or more processors control to process input data according to a predefined operation rule or artificial intelligence model stored in the memory 130. The predefined operation rule or artificial intelligence model is characterized in that it is generated through learning. Here, being generated through learning means that a predefined operation rule or artificial intelligence model with desired characteristics is generated by applying a learning algorithm to a plurality of learning data. Such learning may be performed in a device itself on which artificial intelligence according to the disclosure is performed, or may be performed through a separate server/system.

The artificial intelligence model may be composed of a plurality of neural network layers. Each layer has a plurality of weight values, and a layer operation is performed through an operation result of a previous layer and an operation of the plurality of weights. Examples of neural networks include convolutional neural network (CNN), deep neural network (DNN), recurrent neural network (RNN), restricted Boltzmann machine (RBM), deep belief network (DBN), bidirectional recurrent deep neural network (BRDNN) and deep Q-networks, and the neural network in the disclosure is not limited to the example described above, except as otherwise specified.

The processor 140 may, for example, control a number of hardware or software elements connected to the processor 140 by driving an operating system or application program, and perform various data processing and calculations. Further, the processor 140 may load and process a command or data received from at least one of the other components to a volatile memory and store diverse data in a non-volatile memory.

Particularly, the processor 140 may provide a translation function that translates a plurality of words included in an image acquired through the camera 110. The translation function may be implemented through an OCR module 1000, a sentence completeness identification module 2000, a sentence identification module 3000, a sentence separation module 4000 and a translation module 5000, as illustrated in FIG. 1, each module may be stored in the memory 130.

When the translation function is executed, a plurality of modules 1000 to 5000 may be loaded into a memory (e.g., a volatile memory) included in the processor 140. In other words, when the translation function is executed, the processor 140 may load the plurality of modules 1000 to 5000 from a non-volatile memory into a volatile memory to execute respective functions of the plurality of modules 1000 to 5000. Loading refers to an operation of loading and storing data stored in the non-volatile memory into the volatile memory to be accessed by the processor 140.

As an embodiment of the disclosure, as illustrated in FIG. 1, a translation function may be implemented through a plurality of modules 1000 to 5000 stored in the memory 130, but the translation function is not limited thereto and the translation function may be implemented in an external server.

The plurality of modules 1000 to 5000 according to the disclosure may be implemented by respective software, but is not limited thereto, and some modules may be implemented by a combination of hardware and software. In another embodiment, the plurality of modules 1000 to 5000 may be implemented as one software. Also, some modules may be implemented in the electronic apparatus 100, and some modules may be implemented in an external server.

An optical character reader (OCR) module 1000 is a module for identifying a plurality of words included in an image. Specifically, if the image includes a plurality of words, the OCR module 1000 may extract the plurality of words included in the image through an optical character reader (OCR) method in a text data format that can be processed by the electronic apparatus 100 to acquire a plurality of words.

Figure 2A:
FIG. 2A is a view illustrating an image including a plurality of words according to an embodiment of the disclosure.

In other words, referring to FIG. 2A, the OCR module 1000 may acquire a plurality of words in the image of FIG. 2A, including 'FUEL' 'FOR' 'THE' 'FLYER' 'GOOD' 'NEWS' 'TRAVELS' 'FAST' and 'Sydney' 'Airport'. FIG. 2A is a view illustrating an image including a plurality of words according to an embodiment of the disclosure. FIG. 2B is a view illustrating an image including a plurality of words according to an embodiment of the disclosure.

And, according to an embodiment of the disclosure, the OCR module 1000 may primarily separate a plurality of words included in an image through at least one of a font, a font size, and a font color.

Referring to FIG. 2A, an OCR module 1000 may separate the words 'FUEL' 'FOR' 'THE' 'FLYER' 'GOOD' 'NEWS' 'TRAVELS' 'FAST' and 'Sydney' 'Airport' in the image. And, the OCR module 1000 may identify the words 'FUEL' 'FOR' 'THE' 'FLYER' 'GOOD' 'NEWS' 'TRAVELS' 'FAST' as a plurality of words, and provide the corresponding words to the sentence completeness identification module 2000.

Referring to FIG. 2B, an OCR module 1000 may distinguish "in the morning", "get a discount", "get your hair done!" with other words included in the image (basic perm, clinic perm, etc.).

And, the OCR module 1000 may identify "in the morning" "get a discount", and "get your hair done!" as a plurality of words, and provide the corresponding words to the sentence completeness identification module 2000.

In the prior art, words are separated through at least one of a font, a font size, and a font color of words included in an image simply through the OCR module 1000, and the separated words are provided to the translation model. In other words, in the prior art, the words 'FUEL' 'FOR' 'THE' 'FLYER' 'GOOD' 'NEWS' 'TRAVELS' 'FAST' and the words 'Sydney' and 'Airport' could be separately provided to the translation model. However, there are cases in which sentence separation is necessary even in words that have the same font, font size, and font color. However, in the prior art, even in this case, the entire word was provided to the translation model, so there was a problem in that an accuracy of translation was declined.

Accordingly, the translation function according to the disclosure further uses the sentence completeness identification module 2000, the sentence identification module 3000, and the sentence separation module 4000 to separate and provide a plurality of words acquired through the OCR module 1000 in sentence unit to the translation model.

A sentence completeness identification module 2000 is a module for identifying the sentence completeness of all the plurality of words.

The sentence completeness identification module 2000 may acquire a plurality of words through the OCR module 1000. As an example, through the image of FIG. 2A, the OCR module 1000 may provide the words 'FUEL' 'FOR' 'THE' 'FLYER' 'GOOD' 'NEWS' 'TRAVELS' 'FAST' to the sentence completeness identification module 2000.

In addition, the sentence completeness identification module 2000 may input all the plurality of words into the second language model 200 to identify the sentence completeness of all the plurality of words.

The second language model 200 is a model for allocating a probability value between 0 and 1 to a word sequence, and may identify how natural a combination of a plurality of words is as a sentence. As an embodiment, the sentence completeness identification module 2000 may input a plurality of words into the second language model 200 and acquire a sentence score close to 1 when the sentence is natural through the inputted plurality of words. In addition, the sentence completeness identification module 2000 may input a plurality of words into the second language model 200, and acquire a sentence score close to 0 as the sentence becomes less natural through the inputted plurality of words.

Learning of the second language model 200 may be performed through word data including a plurality of sentences.

In an embodiment according to the disclosure, when a sentence score for all the plurality of words acquired through the second language model 200 is greater than or equal to a predetermined value (e.g., greater than or equal to 0.7), the sentence completeness identification module 2000 may be provided to the sentence identification module 3000. In addition, the processor 140 may separate a plurality of words in sentence units through the sentence identification module 3000. Here, the plurality of words having a score greater than or equal to the predetermined value may be determined by the second language model 200 to be natural as a single sentence.

In addition, when the sentence score for all the plurality of words is less than a predetermined value (e.g., less than 0.7), the sentence completeness identification module 2000 may provide the plurality of words to the sentence separation module 4000. In addition, the processor 140 may separate the plurality of words in sentence units through the sentence separation module 4000.

The sentence identification module 3000 is configured to acquire a combination of a plurality of words by combining a plurality of words in order, and to acquire a first score indicating a sentence completeness of each of the plurality of word combinations.

The sentence identification module 3000 may acquire a plurality of word combinations by combining a plurality of words in order. Specifically, referring to FIG. 3, a plurality of word combinations may be acquired by combining a plurality of words for 'FUEL' 'FOR' 'THE' 'FLYER' 'GOOD' 'NEWS' 'TRAVELS' 'FAST' in order.

Figure 3:
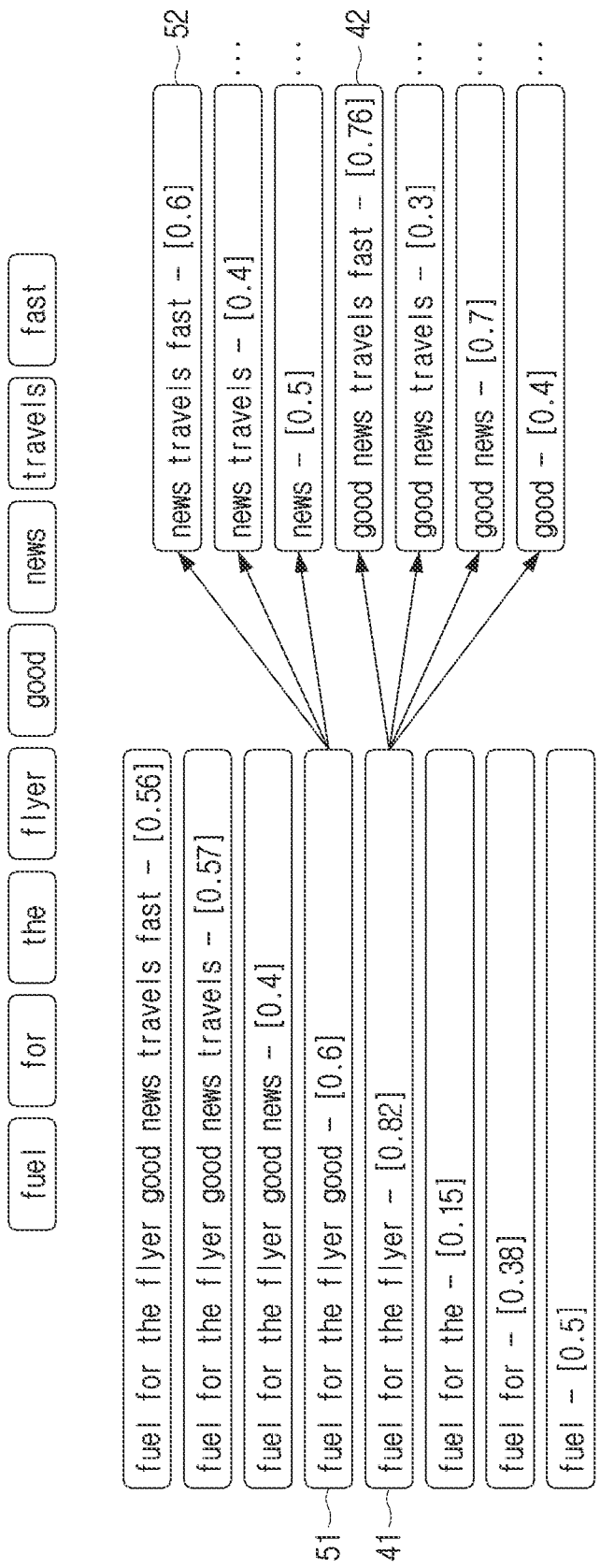
FIG. 3 is a view illustrating a method of acquiring a plurality of word combinations through a sentence identification module and acquiring a first score of each of the plurality of word combinations according to an embodiment of the disclosure.

FIG. 3 is a view illustrating a method of acquiring a plurality of word combinations through a sentence identification module and acquiring a first score of each of the plurality of word combinations according to an embodiment of the disclosure.

In other words, the sentence identification module 3000 may combine a plurality of words (fuel for the flyer good news travels fast) in order to acquire various word combinations such as a word combination in which the plurality of words are identified as one word group, "fuel for the flyer good news travels", a word combination consisting of two words groups consisting of "fuel for the flyer good news travels" and "fast", and a word combination consisting of two words groups consisting of "fuel for the flyer good" and "news travels fast", and a word combination consisting of three words groups consisting of "fuel for the flyer", "good news", "travels fast". In other words, the word combination may consist of at least one word group.

Figure 4:
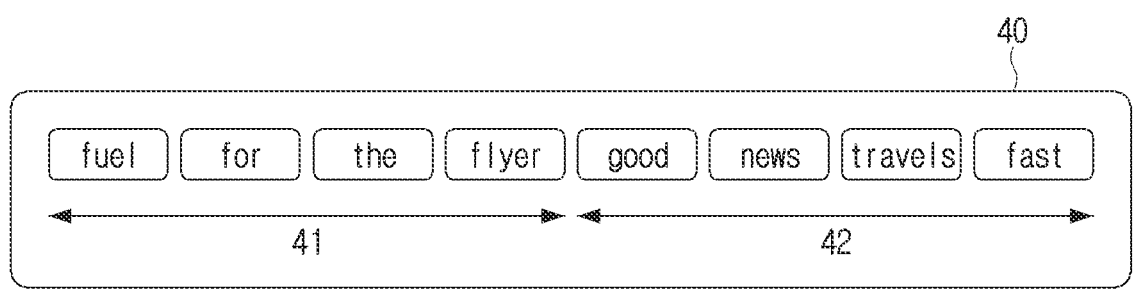
FIG. 4 is a view illustrating a word combination among a plurality of word combinations according to an embodiment of the disclosure.

In an embodiment according to the disclosure, the sentence identification module 3000 may acquire a first word combination 40 composed of a word group 41 of "fuel for the flyer" and a word group 42 of "good news travels fast" in a plurality of words as illustrated in FIG. 4.

FIG. 4 is a view illustrating a word combination among a plurality of word combinations according to an embodiment of the disclosure.

Figure 5:
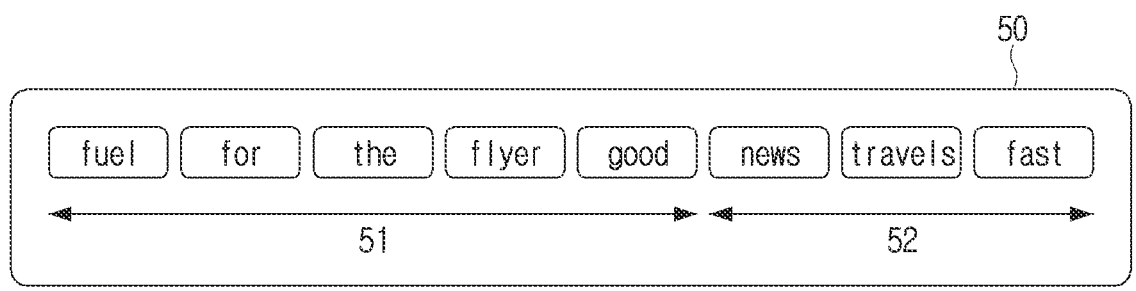
FIG. 5 is a view illustrating a word combination among a plurality of word combinations according to an embodiment of the disclosure.

Referring to FIG. 5, a sentence identification module 3000 may acquire a second word combination 50 composed of a word group 51 of "fuel for the flyer good" and a word group 52 of "news travels fast" in a plurality of words (e.g., second word combination 50).

FIG. 5 is a view illustrating a word combination among a plurality of word combinations according to an embodiment of the disclosure.

In addition, the sentence identification module 3000 may input a plurality of word combinations to the first language model 300, respectively, and acquire a first score indicating a sentence completeness of each of the plurality of word combinations. The first language model 300 is a model, like the second language model 200, for allocating a probability value between 0 and 1 to a word sequence, and identify how natural a combination of a plurality of words is as a sentence. Similar to the second language model 200, the first language model 300 may be performed through word data including a plurality of sentences. As an embodiment, the second language model 200 and the first language model 300 may be different models, but it is not limited thereto and may be implemented as the same model.

Specifically, referring to FIG. 3, a score corresponding to each word group in a plurality of word combinations is illustrated. In other words, the sentence identification module 3000 may acquire a score of 0.56 by inputting "fuel for the flyer good news travels" into the first language model 300.

In addition, the sentence identification module 3000 acquires a score of 0.82 by inputting the word group 41 of "fuel for the flyer" among the first word combinations 40 to the first language model 300, and input the word group 42 of "good news travels fast" to acquire a score of 0.76. In addition, a first score (e.g., 0.79) corresponding to the first word combination 40 between 0 and 1 may be acquired by normalizing the scores of each of the word groups 41 and 42 of the first word combination 40.

In addition, the sentence identification module 3000 may input a word group 51 of "fuel for the flyer good" among the second word combination 50 to the first language model 300 to acquire a score of 0.6, and input a word group 52 of "news travels fast" to acquire a score of 0.6. In addition, a first score (e.g., 0.6) corresponding to the second word combination 50 between 0 and 1 may be acquired by normalizing the scores of each of the word groups 51 and 52 of the second word combination 50.

According to an embodiment of the disclosure, the sentence identification module 3000 may provide a word combination having the highest first score among a plurality of word combinations to the translation module 5000.

The sentence separation module 4000 is configured to separate a plurality of words in sentence units. Also, the sentence separation module 4000 is configured to acquire a second score indicating an accuracy of word combination.

The sentence separation module 4000 may separate a plurality of words in sentence units using the sentence separation model 400. The sentence separation model 400 is a model for receiving a plurality of words, separating the plurality of words in sentence units, and outputting a reliability of the separated sentences. A learning method of the sentence separation model 400 will be described below with reference to FIG. 7.

The sentence separation module 4000 may input all of the plurality of words acquired in the OCR module 1000 to the sentence separation model 400 to separate the plurality of words in sentence units. In other words, through the sentence separation model 400, information on a segment assigned to each word and information on a reliability value between 0 and 1 for the assigned segment may be output.

In addition, the sentence separation module 4000 may acquire one word combination by separating a plurality of words into sentence units based on the information output from the sentence separation model 400.

Figure 6:
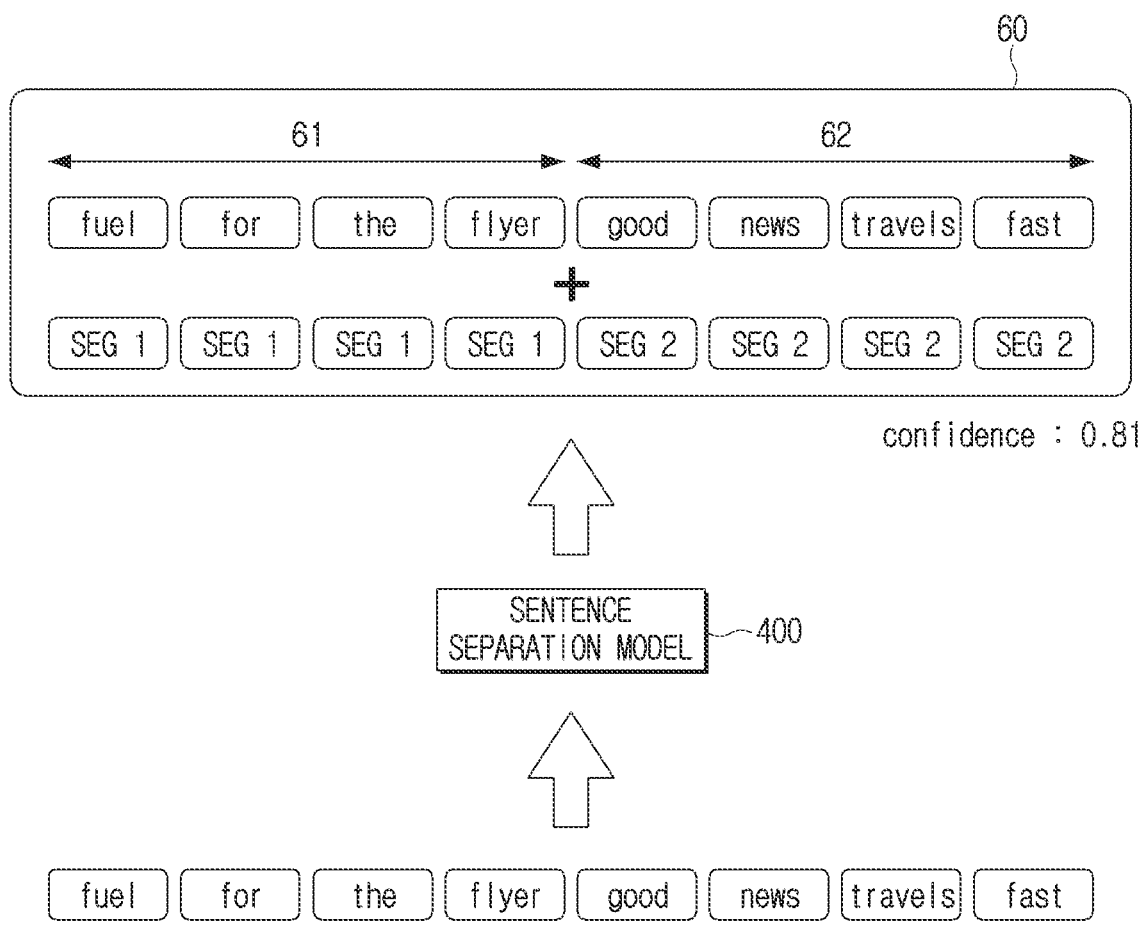
FIG. 6 is a view illustrating an operation of a sentence separation model according to an embodiment of the disclosure.

FIG. 6 is a view illustrating an operation of a sentence separation model according to an embodiment of the disclosure.

Specifically, referring to FIG. 6, a sentence separation module 4000 may input a plurality of words of "fuel for the flyer good news travels fast" to the sentence separation model 400, and acquire information on which segments are assigned to each word together with a reliability value (e.g., 0.81). In addition, the sentence separation module 4000 may separate a plurality of words into sentence units based on the information output from the sentence separation model 400, identify a word assigned to segment 1 into a first word group 61 and identify a word assigned to segment 2 as a second word group 62 to acquire a word combination 60 including the first word group and the second word group.

In the above embodiment, it has been described that a word combination is acquired through the sentence separation model 400, but the disclosure is not limited thereto. In other words, the sentence separation module 4000 may acquire a plurality of word combinations by inputting a plurality of words to the sentence separation model 400, and may acquire a reliability value for each of the plurality of word combinations. For example, the sentence separation module 4000 may input a plurality of words (fuel for the flyer good news travels fast) to the sentence separation model 400, and not only identify a word combination including the first word group 61 and the second word group 62 of FIG. 6 but also identify "fuel for the flyer good" as the first word group, and further acquire a word combination in which "news travels fast" is identified as the second word group and a reliability value (e.g., 0.72) for the corresponding word combination.

According to an embodiment of the disclosure, the sentence separation module 4000 may provide a word combination having the highest reliability value among a plurality of word combinations to the translation module 5000.

The translation module 5000 is a module for performing translation based on a word combination provided by the sentence identification module 3000 and the sentence separation module 4000. As an example, the translation module 5000 may include a neural machine translation (NMT) model including an encoder and a decoder. The translation module 5000 may acquire translated text by inputting the word combination provided by the sentence identification module 3000 and the sentence separation module 4000 to the translation model. In addition, the translation module 5000 may control the display 120 to display the acquired translated text on the display 120. However, it is not limited thereto, and the translation module 5000 may control to output the acquired translated text as voice data.

As described above, a translation function according to the disclosure may identify whether to separate a sentence through the sentence identification module 3000 or the sentence separation module 4000 according to sentence scores for all the plurality of words acquired in the sentence completeness identification module 2000.

However, the disclosure is not limited thereto, and a sentence may be separated from a plurality of words by using the sentence identification module 3000 and the sentence separation module 4000 together. Specifically, when first scores of the plurality of word combinations acquired by the sentence identification module 3000 are all less than a predetermined value (e.g., less than 0.7), the processor 140 may further use the sentence separation module 4000. In addition, when reliability values of at least one word combination acquired by the sentence separation module 4000 are all less than a predetermined value (e.g., less than 0.7), the processor 140 may further use the sentence identification module. Details on this will be described below with reference to FIG. 8.

In addition, in the embodiment described above, only a plurality of word combinations are acquired by combining a plurality of words in order, but the disclosure is not limited thereto. In other words, the electronic apparatus 100 may acquire a plurality of texts and combine the plurality of texts in order to acquire a plurality of morpheme combinations or a plurality of phoneme combinations. In addition, the electronic apparatus 100 may identify a morpheme combination or phoneme combination to be provided to the translation model from among the plurality of morpheme combinations or phoneme combinations.

As an example, when acquiring text "책가방메고학교가자" through the OCR module 1000, the processor 140 may combine the text into [ 책가방 ] [ 메고 ] [ 학교 ] [ 가자 ] and provide the combined text to the translation module 5000.

Meanwhile, when acquiring text "연필책가방가위" through the OCR module 1000, the processor 140 may combine the text through at least one of the sentence completeness identification module 2000 into [ 연필 ] [ 책 ] [ 가방 ] [ 가위 ] to provide the combined text to the translation module 5000. In other words, the translation function according to the disclosure may not only separate sentences for a plurality of words, but also separate words according to morphemes of a plurality of texts. In other words, as in the example above, the translation function according to the disclosure may identify whether to identify "책가방" as one word of [ 책가방 ] or as two words of [ 책 ] [ 가방 ], and according to an identification result, and provide the acquired at least one word to the translation module 5000.

Figure 7:
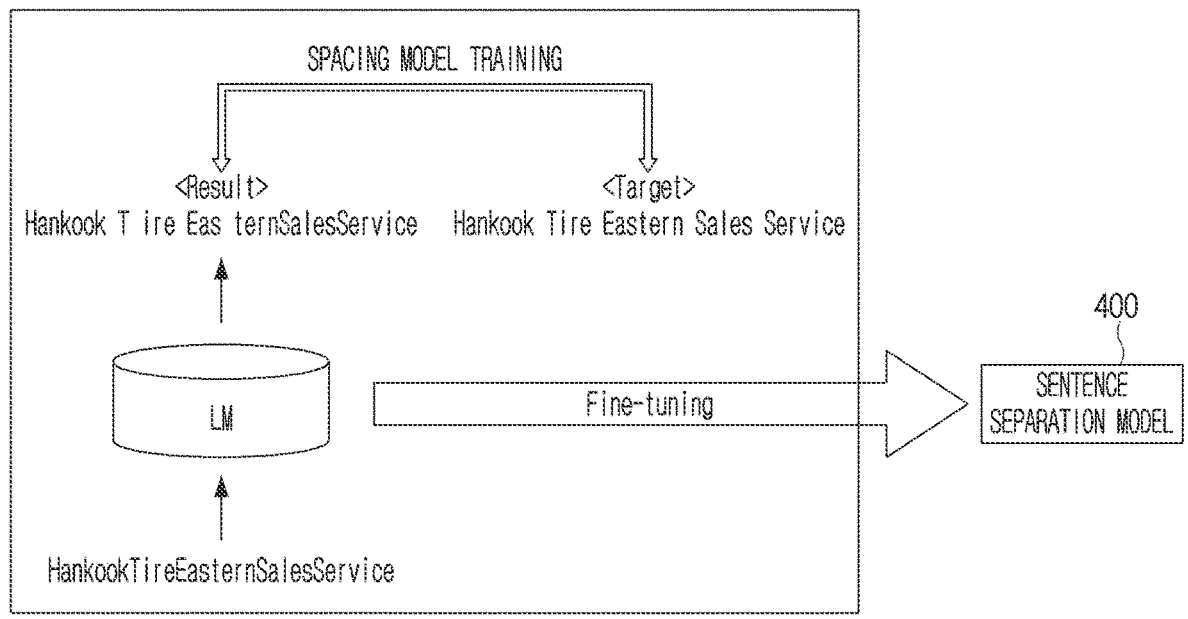
FIG. 7 is a view illustrating a method of learning a sentence separation model according to an embodiment of the disclosure.

FIG. 7 is a view illustrating a method of learning a sentence separation model according to an embodiment of the disclosure.

The sentence separation model 400 according to the disclosure may be learned in various methods.

According to an embodiment of the disclosure, learning of the sentence separation model 400 may be performed based on target data including a plurality of sentences and learning data in which sentence separation is removed from the target data. For example, by using target data including sentences of [fuel for the flyer] and [good news travels fast] and learning data of [fuel for the flyer good news travels fast], when the learning data [fuel for the flyer good news travels fast] is input to the sentence separation model 400, the sentence separation model 400 may be learned to separate the sentences of [fuel for the flyer] and [good news travels fast].

In addition, as an embodiment according to the disclosure, learning of the sentence separation model 400 may be performed through a fine-tuning technique as illustrated in FIG. 7. The fine-tuning technique is a technique for transferring weights of the other learned neural network models to a learning target neural network model, and is a type of transfer learning method. In other words, the weights of the other neural network models may be finely adjusted and applied to the learning target neural network model.

Specifically, referring to FIG. 7, learning of the sentence separation model 400 may be performed by transferring a weight of a neural network model for separating spacing to the sentence separation model 400. The neural network model that separates spacing may be learned based on target data in which spacing is separated and learning data in which separating of spacing is removed from the target data, and when the learning data in which a separation of spacing is removed is input to the neural network model that separates spacing, learning for the corresponding neural network model may be learned such that the target data is output. In addition, learning of the sentence separation model 400 may be performed by applying a weight of the neural network model for separating the learned spacing to the sentence separation model 400.

In other words, a learning of the sentence separation model 400 according to the disclosure may be performed through the neural network model that separates spacing which can be learned with a large amount of learning data.

Figure 8:
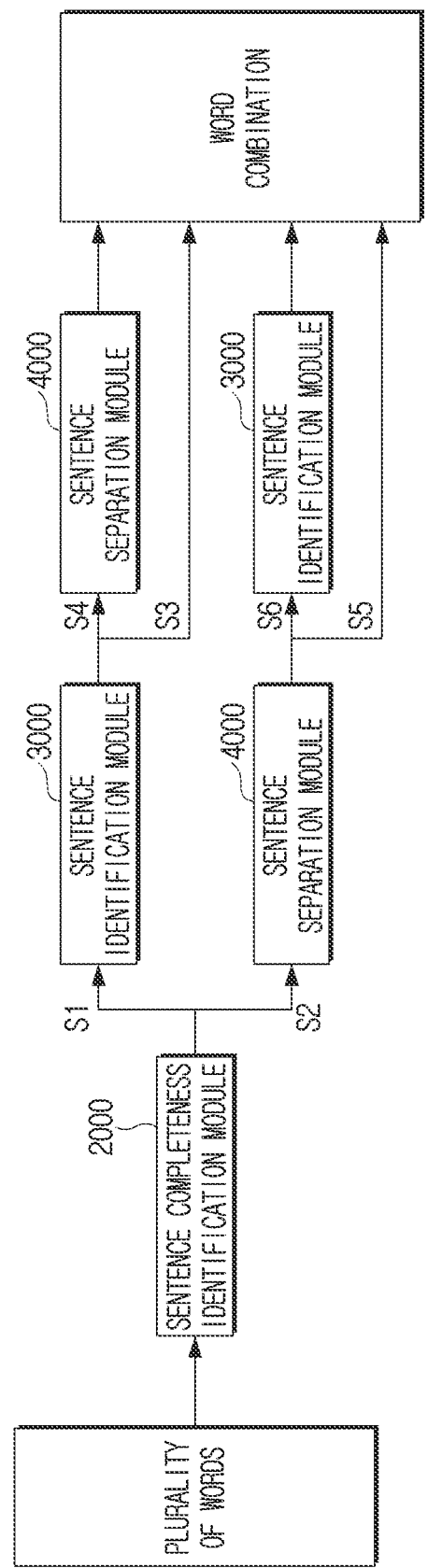
FIG. 8 is a view illustrating a method of acquiring a word combination for providing to a translation model by using a sentence identification module and a sentence separation module together, according to an embodiment of the disclosure.

FIG. 8 is a view illustrating a method of acquiring a word combination for providing to a translation model by using a sentence identification module and a sentence separation module together according to an embodiment of the disclosure;

Referring to FIG. 8, a sentence completeness identification module 2000 may identify sentence scores for all of a plurality of words through the plurality of words. In other words, as described above in FIG. 1, the sentence completeness identification module 2000 may input a plurality of words into the second language model 200 to acquire a sentence score indicating how natural the plurality of words are as a sentence.

As an example, when the plurality of words include a word A, a word B, and a word C, the sentence completeness identification module 2000 may input the word A, the word B, and the word C into the second language model 200, and acquire a sentence score indicating how a sentence composed of the word A, the word B, and the word C is as a sentence.

In addition, when the sentence score is equal to or greater than a predetermined value (e.g., 0.7 or greater), the sentence completeness identification module 2000 may provide a plurality of words to the sentence identification module 3000 (S1). Meanwhile, when the sentence score is less than the predetermined value (e.g., less than 0.7), the sentence completeness identification module 2000 may provide a plurality of words to the sentence separation module 4000 (S2).

If it is identified that the sentence score is equal to or greater than the predetermined value, the sentence identification module 3000 may acquire a plurality of word combinations through the process 51 by combining a plurality of words in order, and acquire a first score indicating a sentence completeness of each of the plurality of word combinations for each of the plurality of word combinations.

As an example, the sentence identification module 3000 may combine a plurality of words including the word A, the word B, and the word C in order, and acquire a first word combination with respect to [word A, word B, word C] in which three words are identified as one sentence, a second word combination with respect to [word A, word B], [word C] in which the word A and word B are identified as one sentence and the word C is identified as one sentence, a third word combination with respect to [word A], [word B, word C], and a fourth word combination with respect to [word A], [word B], and [word C].

In addition, the sentence identification module 3000 may input each of the word groups constituting the plurality of word combinations into the first language model 300 to acquire a score corresponding to each of the word groups. In addition, a first score corresponding to each of the plurality of word combinations may be acquired based on scores corresponding to each of the word groups.

In other words, the sentence identification module 3000 may acquire a score by inputting the [word A, word B, word C] word group of the first word combination into the first language model 300. The corresponding score may be identified as a first score corresponding to the first word combination.

In addition, the sentence identification module 3000 may acquire a score by inputting the [word A, word B] word group of the second word combination into the first language model 300, and acquire a score by inputting the [word C] word group of the second word combination to the first language model 300. In addition, a first score corresponding to the second word combination may be acquired based on the acquired two scores. For example, a first score having a value between 0 and 1 may be acquired by normalizing scores of each of the second word groups. However, it is not limited thereto, and an average value of the scores of each of the second word groups may be identified as the first score.

In addition, when there is a word combination having a first score equal to or greater than a predetermined value (e.g., 0.7) among a plurality of word combinations, the sentence identification module 3000 may provide a word combination having the highest first score to the translation module 5000 (S3). When the first score for at least one of the plurality of word combinations is equal to or greater than the predetermined value, the sentence identification module 3000 may provide the word combination having the highest first score among the plurality of word combinations to the translation module 5000 to perform translation through the corresponding word combination.

Meanwhile, when the first score for each of the plurality of word combinations are all identified as being less than the predetermined value (e.g., 0.7), the sentence identification module 3000 may provide the plurality of word combinations to the sentence separation module 4000 (S4).

When it is identified that the first score for each of the plurality of word combinations are all less than the predetermined value (e.g., 0.7), the sentence separation module 4000 may input the plurality of word combinations into the sentence separation model 400, respectively, and acquire a second score for each of the plurality of word combinations.

Specifically, the sentence separation module 4000 may input each of at least one word group constituting the first word combination among the plurality of word combinations into the sentence separation model 400 to acquire a score for each of the at least one word group, and acquire a second score corresponding to the first word combination based on the score.

As an example, the sentence separation module 4000 may input the word group [word A, word B, word C] constituting the first word combination among a plurality of word combinations including a plurality of words containing word A, word B, and word C, and identify the acquired reliability value as a second score corresponding to the first word combination.

In addition, the sentence separation module 4000 may input the [word A, word B] word group constituting the second word combination into the sentence separation model 400 to acquire a reliability value corresponding to the word group [word A, word B]. In other words, when the word group [word A, word B] is input to the sentence separation model 400, [word A, word B] may be identified as one sentence, and first output information on a reliability value for the sentence and [word A] [word B] may be identified as two sentences, and second output information on the reliability value for the two sentences may be output. In addition, the sentence separation module 4000 may acquire a reliability value corresponding to the word group [word A, word B] based on the first output information.

In addition, the sentence separation module 4000 may input the [word C] word group constituting the second word combination into the sentence separation model 400 to acquire a reliability value corresponding to the [word C] word group. In addition, a second score corresponding to the second word combination may be acquired based on the two reliability values. As an example, a second score having a value between 0 and 1 may be acquired by normalizing two reliability values. As an example, an average value of two reliability values may be identified as the second score.

The sentence separation module 4000 may identify a word combination among a plurality of word combinations based on the second score. In addition, the sentence separation module 4000 may provide the identified one word combination to the translation module 5000. For example, the sentence separation module 4000 may provide a word combination having the highest second score among the plurality of word combinations, to the translation module 5000.

If it is identified that the sentence score is less than a predetermined value, the sentence separation module 4000 may input a plurality of words to the sentence separation model 400 through the process S2 to acquire at least one word combination and a reliability value for each of at least one word combination.

As an example, the sentence separation module 4000 may input a plurality of words including the word A, the word B, and the word C into the sentence separation model 400, and acquire the first word combination with respect to [word A, word B, and word C], the second word combination with respect to [word A, word B], [word C] in which the word A and word B are identified as one sentence, the third word combination with respect to [word A], [word B, word C], and the fourth word combination with respect to [word A], [word B], and [word C]. Here, a reliability value of the second word combination may be a value indicating how natural the two sentences composed of [word A, word B] and [word C] are as a sentence.

In addition, the sentence separation module 4000 may provide a word combination having the highest reliability value to the translation module 5000 when a word combination having a reliability value of a predetermined value (e.g., 0.7) or more exists among at least one word combination (S5).

Meanwhile, if the reliability values for each of the at least one word combination are all identified as being less than a predetermined value (e.g., 0.7), the sentence separation module 4000 may provide the at least one word combination to the sentence identification module 3000 (S6).

When it is identified that the reliability values for each of the at least one word combination are all less than the predetermined value (e.g., 0.7), the sentence identification module 3000 may input the at least one word combination into the first language model 300, respectively, a score may be acquired for each of the at least one word combination.

As an example, the sentence identification module 3000 may input the first word combination with respect to [word A, word B, and word C], the second word combination with respect to [word A, word B], [word C] in which the word A and word B are identified as one sentence, the third word combination with respect to [word A], [word B, word C], and the fourth word combination with respect to [word A], [word B], and [word C], to acquire a score for each of the at least one word combination. Specifically, the sentence identification module 3000 may input [word A, word B] into the first language model 300 to acquire a score, and input [word C] into the first language model 300 to acquire a score, and acquire a score for the second word combination based on the acquired two scores.

In addition, the sentence identification module 3000 may identify one word combination from among the at least one word combination based on the scores for each of the at least one word combination. And, the sentence identification module 3000 may provide the identified single word combination to the translation module 5000.

As an example, the sentence identification module 3000 may provide a word combination having the highest score among at least one word combination to the translation module 5000.

Figure 9A:
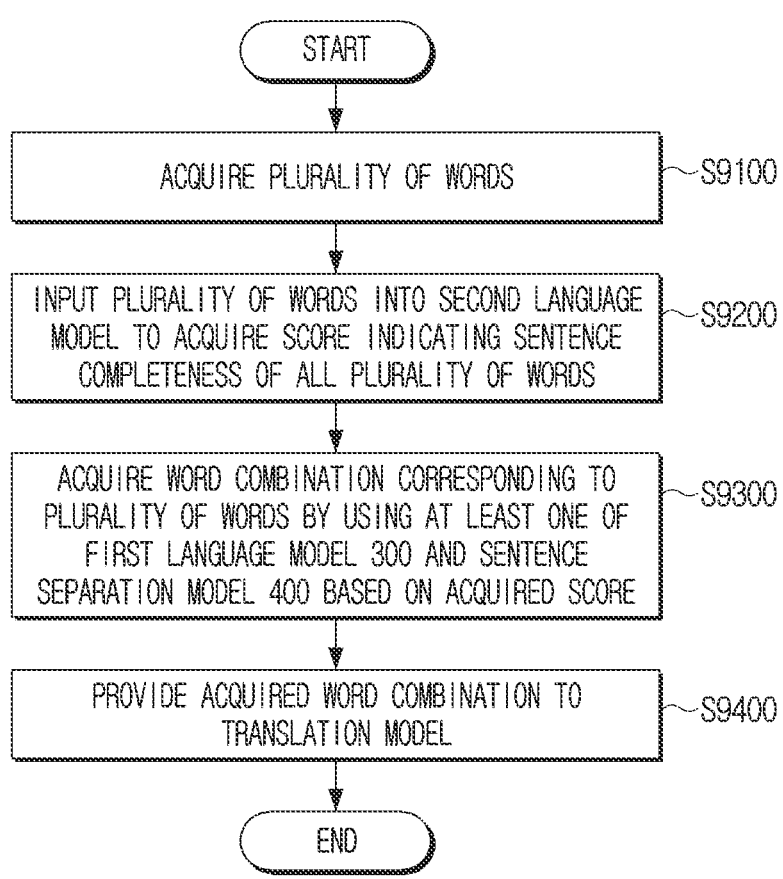
FIG. 9A is a flowchart illustrating a method of acquiring a word combination by using a first language model and a sentence separation model together according to an embodiment of the disclosure.

FIG. 9A is a flowchart illustrating a method of acquiring a word combination by using a first language model and a sentence separation model together, according to an embodiment of the disclosure.

Referring to FIG. 9A, an electronic apparatus 100 may acquire a plurality of words at operation S9100. For example, the electronic apparatus 100 may acquire a plurality of words from an image acquired by a camera.

In addition, the electronic apparatus 100 may input a plurality of words into the second language model 200 to acquire a score indicating completeness of sentences of all the plurality of words at operation S9200.

The electronic apparatus 100 may acquire a word combination corresponding to a plurality of words by using at least one of the first language model 300 and the sentence separation model 400 based on the acquired score at operation S9300. The operation S9300 will be described below in detail with reference to FIG. 9B.

Also, the electronic apparatus 100 may provide the acquired word combination to the translation model at operation S9400.

Figure 9B:
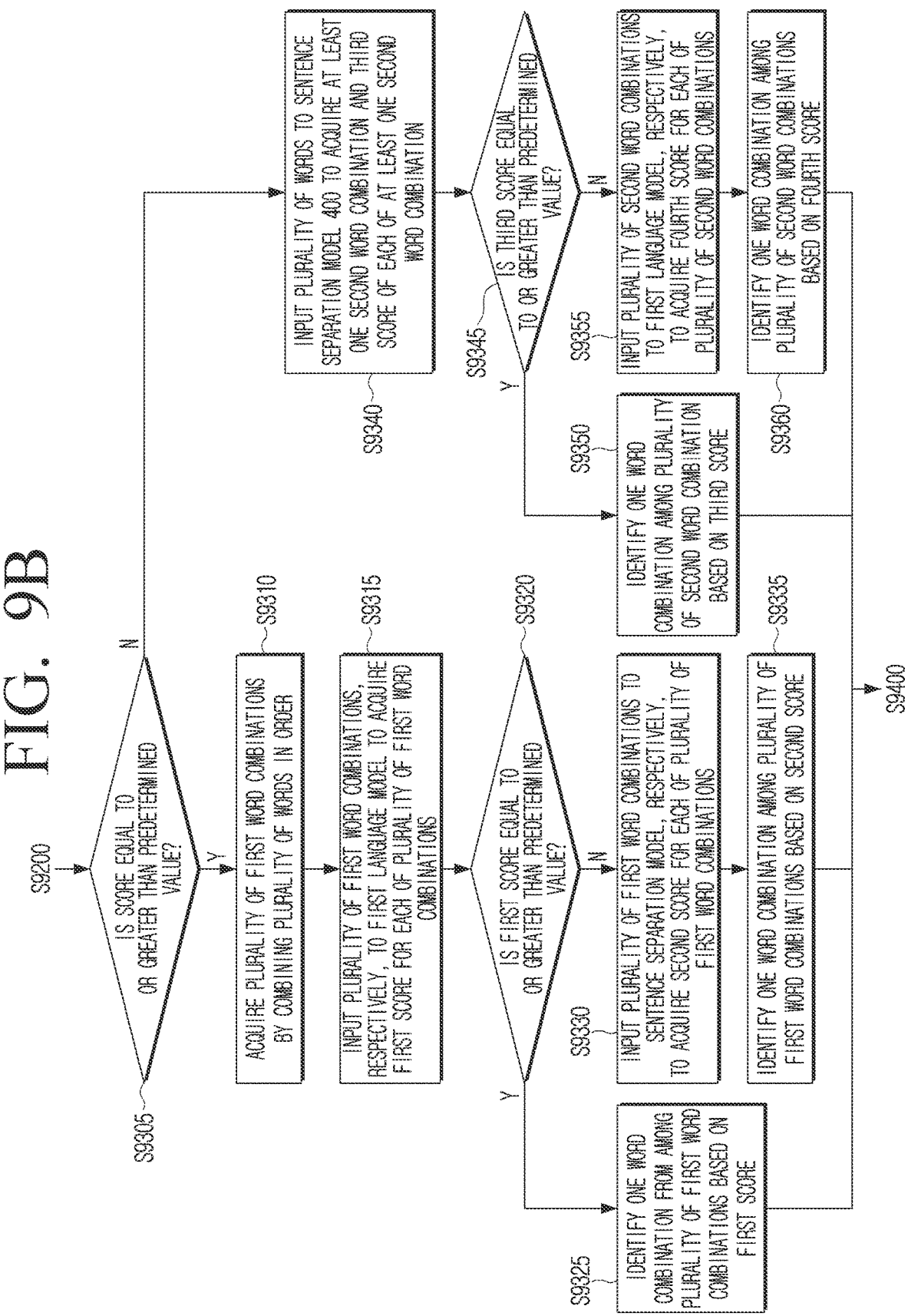
FIG. 9B is a flowchart illustrating a method of acquiring a word combination by using a first language model and a sentence separation model together, according to an embodiment of the disclosure.

FIG. 9B is a flowchart illustrating a method of acquiring a word combination by using a first language model and a sentence separation model together, according to an embodiment of the disclosure.

Referring to FIG. 9B, at operation S9200, a score indicating a completeness of sentences for all the plurality of words is acquired through the second language model 200, and when the score is greater than or equal to a predetermined value (e.g., 0.7) (S930-Y), the electronic apparatus 100 may acquire a plurality of first word combinations by combining a plurality of words in order at operation S9310. Also, the electronic apparatus 100 may acquire a first score for each of the plurality of first word combinations by inputting a plurality of first word combinations, respectively, to the first language model 300 at operation S9315.

In addition, when the first score is equal to or greater than a predetermined value (S9320-Y), the electronic apparatus 100 may identify a word combination from among the plurality of first word combinations based on the first score at operation S9325. For example, the electronic apparatus 100 may identify a word combination having the highest first score among a plurality of first word combinations. The electronic apparatus 100 may provide the identified word combination to the translation model at operation S9400.

In addition, when the first score is less than a predetermined value (S9320-N), the electronic apparatus 100 may input a plurality of first word combinations into the sentence separation model 400, respectively, to acquire a second score for each of the at least one first word combination at operation S9330. The electronic apparatus 100 may identify a word combination among the at least one first word combination based on the second score at operation S9335.

Also, the electronic apparatus 100 may provide the identified one word combination to the translation model at operation S9400.

Referring to FIG. 9B, at operation S9200, a score indicating a completeness of sentences for all the plurality of words is acquired through the second language model 200, and when the score is less than a predetermined value (e.g., 0.7) (S9305-N), the electronic apparatus 100 may input a plurality of words into the sentence separation model 400 to acquire at least one second word combination and a third score of each of the at least one second word combination at operation S9340. Here, the third score means a reliability value of each of at least one second word combination acquired by inputting a plurality of words into the sentence separation model 400.

When the third score is equal to or greater than the predetermined value (S9345-Y), the electronic apparatus 100 may identify one word combination among at least one second word combination based on the third score at operation S9350. For example, the electronic apparatus 100 may identify a word combination having the highest third score among at least one second word combination. The electronic apparatus 100 may provide the identified one word combination to the translation model at operation S9400.

Meanwhile, when the third score is less than the predetermined value (S9345-N), the electronic apparatus 100 may input a plurality of second word combinations into the first language model 300, respectively, to acquire a fourth score for each of the at least one second word combination at operation S9355. Here, the fourth score means a score for each of the plurality of second word combinations acquired based on the scores for each of the word groups constituting the plurality of second word combinations. The electronic apparatus 100 may identify a word combination among the at least one second word combination based on the fourth score at operation S9360. For example, the electronic apparatus 100 may identify a word combination having the highest fourth score among at least one second word combination. Also, the electronic apparatus 100 may provide the identified one word combination to the translation model at operation S9400.

FIG. 10 is a flowchart illustrating a method of controlling an electronic apparatus according to an embodiment of the disclosure.

Referring to FIG. 10, an electronic apparatus 100 may acquire a plurality of words at operation S1010. Specifically, the electronic apparatus 100 may acquire an image including a plurality of words, perform image recognition on the acquired image, and acquire a plurality of words included in the image. For example, the electronic apparatus 100 may acquire a plurality of words included in an image through an OCR method.

In addition, the electronic apparatus 100 may acquire a plurality of word combinations by combining the plurality of words in order at operation S1020.

According to an embodiment of the disclosure, prior to the operation S1020, the electronic apparatus 100 may input a plurality of words into the second language model to acquire a sentence score indicating a completeness of sentences of all the plurality of words. As an embodiment, the electronic apparatus 100 may acquire a sentence score for all of the plurality of words by inputting the plurality of words into the second language model 200 of FIG. 1. In addition, if it is identified that the sentence score is equal to or greater than a predetermined value (e.g., 0.7), the electronic apparatus 100 may perform the operation S1020. Meanwhile, when it is identified that the sentence score is less than the predetermined value, the electronic apparatus 100 may input the plurality of words into the sentence separation model 400 to acquire a word combination acquired by separating the plurality of words into sentence units. In addition, the electronic apparatus 100 may provide the acquired word combination to the translation model. Here, the sentence separation model 400 may be learned based on target data including the plurality of sentences and learning data in which sentence separation is removed from the target data. Alternatively, the sentence separation model 400 may be learned through transfer learning using a pre-learned neural network model that separates spacing from words.

Then, when a plurality of word combinations are acquired at operation S1020, the electronic apparatus 100 may acquire a first score indicating a sentence completeness of each of the plurality of word combinations by inputting the plurality of word combinations into the first language model, respectively at operation S1030. As an embodiment, the electronic apparatus 100 may acquire a first score corresponding to each of the plurality of word combinations by inputting the plurality of word combinations into the first language model 300 of FIG. 1, respectively.

Specifically, the electronic apparatus 100 may acquire a score corresponding to each of the at least one word group by inputting at least one word group constituting the first word combination among the plurality of word combinations into the first language model. In addition, the electronic apparatus 100 may acquire a first score corresponding to the first word combination based on a score corresponding to each of the at least one word group.

When it is identified that the first score for each of the plurality of word combinations are all less than a predetermined value (e.g., 0.7) at operation S1040, the electronic apparatus 100 may input each of the plurality of word combinations to the sentence separation model 400 to acquire a second score for each of the plurality of word combinations at operation S1050. As an embodiment, the electronic apparatus 100 may acquire a score corresponding to each of the at least one word group by inputting at least one word group constituting the first word combination into the sentence separation model 400. In addition, the electronic apparatus 100 may acquire a second score corresponding to the first word combination based on the scores of each of the at least one word group.

Although the embodiment described above has been described as inputting all of the plurality of word combinations into the sentence separation model 400, the disclosure is not limited thereto. For example, when the first score for each of the plurality of word combinations are all identified as being less than a predetermined value, the electronic apparatus 100 may identify at least one word combination among the plurality of word combinations based on the first score. As an example, three word combinations having the highest first score among the plurality of word combinations may be identified. In addition, the electronic apparatus 100 may input each of at least one word combination to the sentence separation model 400 to acquire a second score for each of the at least one word combination. In addition, the electronic apparatus 100 may identify one word combination among at least one word combination based on the second score at operation S1060. In other words, the electronic apparatus 100 may identify a word combination having the highest second score among at least one word combination. Additionally, the electronic apparatus 100 may provide the acquired word combination to the translation model at operation S1070.

The disclosure may have several embodiments, and the embodiments may be modified variously. In the following description, specific embodiments are provided with accompanying drawings and detailed descriptions thereof. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

In describing embodiments, detailed description of relevant known functions or components may be omitted if it would obscure the description of the subject matter.

In addition, the various embodiments may be changed in various forms, and therefore, the technical scope is not limited to the following embodiments. Rather, these embodiments are provided to make the disclosure thorough and complete.

The terms used herein are solely intended to explain a specific embodiment, and not to limit the scope of the disclosure. Singular forms are intended to include plural forms unless the context clearly indicates otherwise.

The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

On the other hand, when an element (e.g., a first element) is "directly coupled with/to" or "directly connected to" another element (e.g., a second element), an element (e.g., a third element) may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level.

Under certain circumstances, the term "device configured to" may refer to "device capable of" doing something together with another device or components. For example, the processor configured to perform "A, B, and C" may be realized a dedicated processor for performing functions (for example, embedded processor) or a generic-purpose processor for performing functions by running one or more software programs stored in a memory device (for example, a CPU or an application processor).

In the embodiments disclosed herein, a term 'module' or 'unit' refers to an element that performs at least one function or operation. The 'module' or 'unit' may be realized as hardware, software, or combinations thereof. In addition, a plurality of 'modules' or 'units' may be integrated into at least one module and may be realized as at least one processor in an integrated manner except for 'modules' or 'units' that should be realized in specific hardware.

Further, various elements and areas in the drawings are schematically drawn. Therefore, the technical ideas are not limited by a relative size or interval drawn in the accompanying drawings.

Various embodiments described above may be embodied in a recording medium that may be read by a computer or a similar apparatus to the computer by using software, hardware, or a combination thereof. According to the hardware embodiment, various embodiments that are described in the disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, the embodiments described herein may be implemented by the processor itself. In a software configuration, various embodiments described in the specification such as a procedure and a function may be embodied as separate software modules. The software modules may respectively perform one or more functions and operations described in the specification.

Methods of controlling a display apparatus according to various embodiments may be stored on a non-transitory readable medium. The non-transitory readable medium may be installed and used in various devices.

The non-transitory computer readable recording medium refers to a medium that stores data and that can be read by devices. Specifically, programs of performing the above-described various methods can be stored in a non-transitory computer readable medium such as a compact disc (CD), a digital versatile disc (DVD), a hard disk, a Blu-ray disk, universal serial bus (USB), a memory card, ROM, or the like, and can be provided.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an electronic apparatus comprising:
   acquiring a plurality of words based on an image including a plurality of words;
   acquiring a plurality of word combinations by combining the plurality of words, by inputting at least one word group constituting a first word combination among the plurality of word combinations to a first language model for identifying a sentence completeness, respectively, acquiring scores corresponding to each of at least one word group, and acquiring first scores indicating a sentence completeness of each of the plurality of word combinations based on the scores corresponding to each of the at least one word group;

based on all the first scores with respect to each of the plurality of word combinations being identified to be less than a predetermined value, by inputting the at least one word group constituting the first word combination to a sentence separation model for identifying an accuracy of a word combination, respectively, acquiring scores corresponding to each of the at least one word group, and acquiring second scores for each of the plurality of word combinations based on the scores corresponding to each of the at least one word group;

identifying one word combination among the plurality of word combinations based on the second scores; and providing the identified one word combination to a translation model which performs translation.

2. The method of claim 1, wherein the identifying the one word combination further comprises:
based on a first word combination in which the first scores are equal to or greater than a predetermined value being identified to be existed among the plurality of word combinations, identifying one word combination among the plurality of word combinations based on a first score.

3. The method of claim 1, wherein the acquiring the plurality of words comprises:
acquiring the image including a plurality of words; and
acquire the plurality of words included in the image by performing an image recognition for the image.

4. The method of claim 1, wherein the acquiring a first score comprises:
acquire a sentence score indicating a sentence completeness of all the plurality of words by inputting the plurality of words to a second language model; and
based on the sentence score being identified to be equal to or greater than the predetermined value, acquire a plurality of word combinations by combining the plurality of words, and acquire the first score by inputting the plurality of word combinations, respectively, to the first language model.

5. The method of claim 4, further comprising:
based on the sentence score being identified to be less than the predetermined value, acquire a word combination obtained by separating the plurality of words into sentence units by inputting the plurality of words to the sentence separation model; and
providing the word combination to the translation model.

6. The method of claim 1, wherein the acquiring a first score comprises:
based on scores corresponding to each of the at least one word group, acquiring a first score corresponding to the first word combination.

7. The method of claim 6, wherein the acquiring a second score comprises:
based on the scores corresponding to each of the at least one word group, acquiring the second score corresponding to the first word combination.

8. The method of claim 1,
wherein the acquiring a second score comprises:
based on the first scores with respect to each of the plurality of word combinations being identified to be less than the predetermined value, identifying at least one word combination among the plurality of word combinations based on the first scores, and acquire second scores with respect to each of the at least one word combination by inputting each of the at least one word combination to the sentence separation model, and wherein the identifying the one word combination comprises:
based on the second scores, identifying at least one word combination among the at least one word combination.

9. The method of claim 1, wherein the sentence separation model is configured to be learned based on target data including a plurality of sentences and learning data in which sentence separation is removed from the target data.

10. The method of claim 9, wherein the sentence separation model is configured to be learned by using a pre-learned neural network model that separates spacing between words.

11. An electronic apparatus comprising:
a memory configured to store at least one instruction; and
a processor configured to execute at least one instruction stored in the memory to control the electronic apparatus,
wherein the processor is configured to:
acquire a plurality of words based on an image including a plurality of words,
acquire a plurality of word combinations by combining the plurality of words, by inputting at least one word group constituting a first word combination among the plurality of word combinations to a first language model for identifying a sentence completeness, respectively, acquiring scores corresponding to each of at least one word group,
acquire first scores indicating sentence completeness of each of the plurality of word combinations based on the scores corresponding to each of the at least one word group,
based on all the first scores with respect to each of the plurality of word combinations being identified to be less than a predetermined value, by inputting the at least one word group constituting the first word combination to a sentence separation model for identifying an accuracy of a word combination, respectively, acquiring scores corresponding to each of the at least one word group, and acquire second scores for each of the plurality of word combinations based on the scores corresponding to each of the at least one word group,
identify one word combination among the plurality of word combinations based on the second scores, and
provide the identified one word combination to a translation model which performs translation.

12. The apparatus of claim 11, wherein the processor is configured to, based on a first word combination in which the first scores are equal to or greater than a predetermined value being identified to be existed among the plurality of word combinations, identify one word combination among the plurality of word combinations based on a first score.

13. The apparatus of claim 11, wherein the processor is configured to:
acquire the image including a plurality of words; and
acquire the plurality of words included in the image by performing an image recognition for the image.

14. The apparatus of claim 11, wherein the processor is configured:

acquire a sentence score indicating a sentence completeness of all the plurality of words by inputting the plurality of words to a second language model;
based on the sentence score being identified to be equal to or greater than the predetermined value, acquire a plurality of word combinations by combining the plurality of words; and
acquire a first score by inputting the plurality of word combinations, respectively, to the first language model.

15. The apparatus of claim 14, wherein the processor is configured to:
based on the sentence score being identified to be less than the predetermined value, acquire a word combination obtained by separating the plurality of words into sentence units by inputting the plurality of words to the sentence separation model; and
provide the word combination to the translation model.

* * * * *